United States Patent [19]
Bogusz

[11] 3,849,663
[45] Nov. 19, 1974

[54] VEHICLE ANTI-THEFT DEVICE
[76] Inventor: Frank J. Bogusz, Earls Court, Farmington, Conn. 06032
[22] Filed: Sept. 20, 1973
[21] Appl. No.: 398,986

[52] U.S. Cl. ......... 307/10 AT, 200/61.58, 180/114, 340/64
[51] Int. Cl. ............................................. H02g 3/00
[58] Field of Search ............ 307/10 AT, 10 R, 113; 340/64; 180/114; 200/56, 61.58

[56] References Cited
UNITED STATES PATENTS

| 2,515,044 | 7/1950 | Kappel | 307/10 AT |
| 3,296,591 | 1/1967 | Fontaine | 307/10 AT |
| 3,623,569 | 11/1971 | Wilkins | 307/10 AT |

*Primary Examiner*—Herman Hohauser

[57] ABSTRACT

A vehicle anti-theft device comprising an ignition system including a pair of starter contacts adapted to be selectively closed and a pair of enabling contacts, means for starting the vehicle, means for actuating the starter means when the starter contacts and the enabling contacts are closed, a radio including a tuner selectively locatable at any of at least a plurality of settings, and means for closing the enabling contacts when the tuner has been located at a selected setting.

6 Claims, 7 Drawing Figures

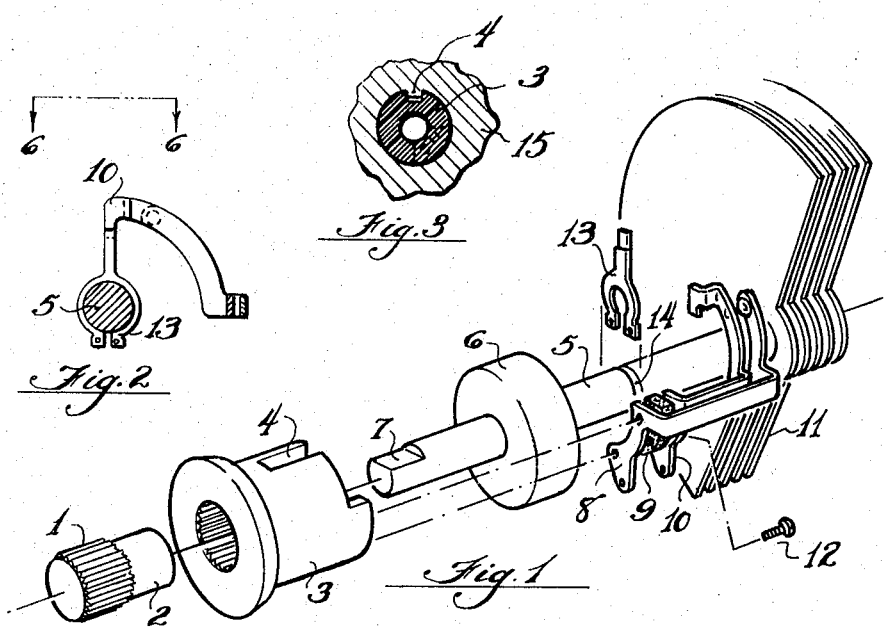
Fig. 2
Fig. 3
Fig. 1
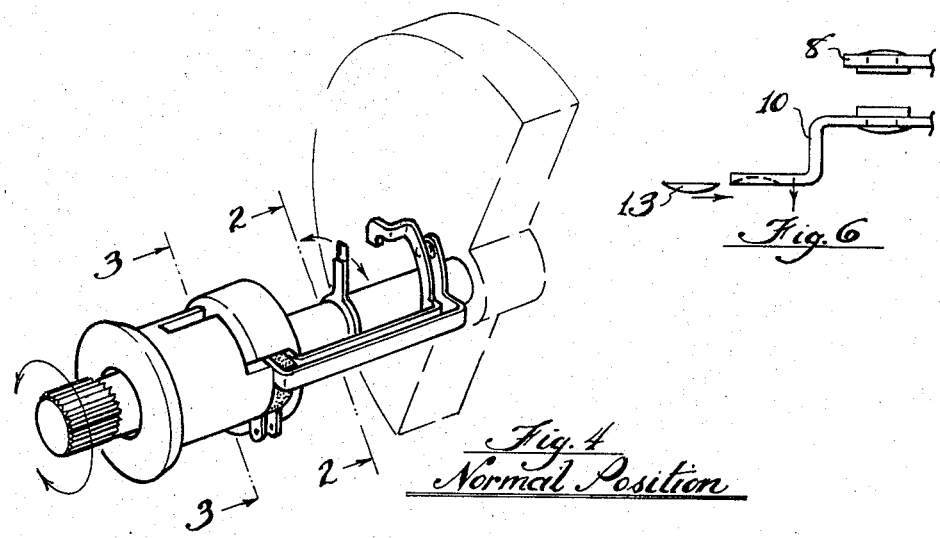
Fig. 6
Fig. 4 Normal Position
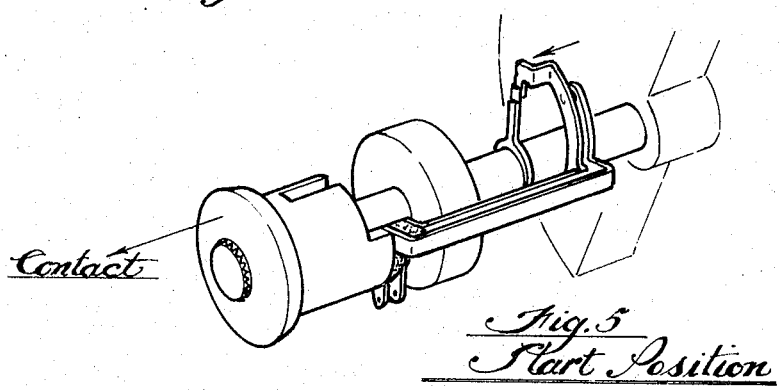
Fig. 5 Start Position

VEHICLE ANTI-THEFT DEVICE

The present invention relates to vehicle anti-theft devices and more particularly to vehicle anti-theft devices which require manual manipulation to permit operation of the vehicle.

Conventional vehicle anti-theft devices are generally independent of the basic vehicle systems and as a result add substantially to the cost of the vehicle.

It is accordingly an object of the present invention to provide a vehicle anti-theft device which substantially utilizes already existing vehicle systems.

Among the advantages of the present invention is the provision of a vehicle anti-theft device which requires little if any space in addition to the space occupied by already existing automotive systems.

Another advantage of the present invention is the provision of a vehicle anti-theft device which may require a selectively variable degree of manual manipulation to permit operation of the vehicle whereby a voluntary system for inhibiting the operation of the vehicle by an intoxicated operator is provided.

Additional objects and advantages of the present invention will become apparent from the following portion of this specification which in conjunction with the appended drawings discloses in accordance with the mandate of the patent statutes a presently preferred embodiment of the invention.

Referring to the drawings:

FIG. 1 is an oblique exploded view, of the radio associated portion of the vehicle anti-theft device illustrated in FIG. 7;

FIG. 2 is a view of the radio associated portion of the vehicle anti-theft device taken along the lines 2—2 of FIG. 4;

FIG. 3 is a view of the radio associated portion of the vehicle anti-theft device taken along the lines 3—3 of FIG. 4 with the radio housing being shown;

FIG. 4 is a view similar to that of FIG. 1 illustrating the vehicle anti-theft device in the normal position;

FIG. 5 is a view similar to that of FIG. 4 with the radio associated portion of the vehicle anti-theft device in the start position;

Figure 7:
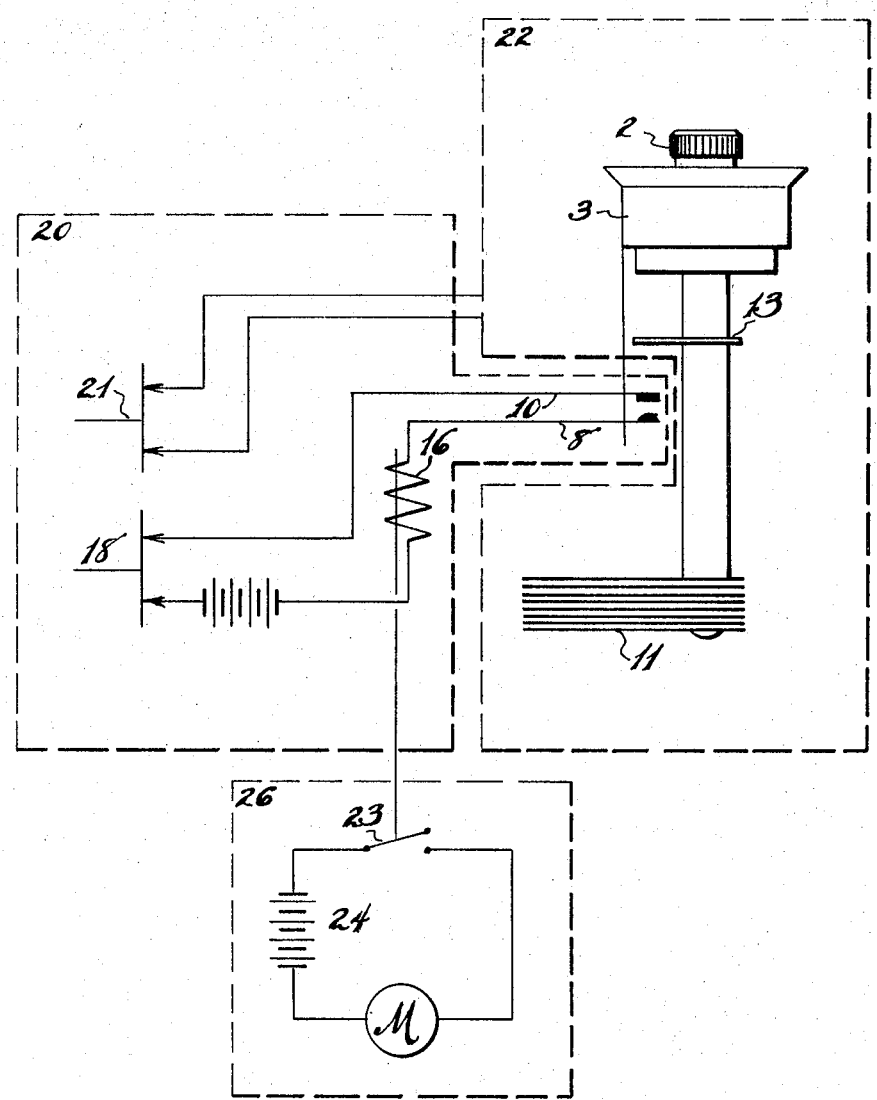

FI G. 6 is a view of the radio associated portion of the vehicle anti-theft device illustrated in FIG. 2 taken along the lines 6—6 thereof; and FIG. 7 is a diagrammatic representation of the vehicle anti-theft device.

The automobile anti-theft device is illustrated in FIG. 7 and includes a key or code actuated ignition system 20. Turning the key (not shown) to a first or "on" position closes a pair of ignition contacts 21 which enable electrical accessories such as a radio 22. Further turning of the key to a "start" position will, if the vehicle anti-theft device is in the "start" position, close a pair of starter contacts 18 and actuate a starter solenoid 16 which closes a starter switch 23 to energize the battery 24 operated starter motor M which starts the vehicle drive motor (not shown).

While the invention is illustrated with regard to the starter circuit it could be utilized in conjunction with an electrically operated steering wheel lock system or with any other basic electrical system 26.

The radio FIG. 1 includes a drive spline 2 which is mounted on a tuning shaft drive shaft 7. The drive shaft acts through a gear reducer or the like 6 on a tuning shaft 5 to rotate the non-stationary portion of a variable condensor 11 to change the setting (frequency) of the radio. The drive spline 2 includes a raised annular end or tuning knob 1 portion which includes a plurality of axially extending continuous equidimensioned grooves, the base of which lie radially above the drive spline.

An actuating member 3 is concentrically mounted for sliding displacement along the drive spline 2 and tuning shaft drive shaft 7 and is matingly received in a suitable radio housing 15 bore 25. Rotation of the actuating member relative to the radio housing is prevented by a pin 4 and groove 14 connection between the actuating member 3 and the housing 15.

The ignition system 20 additionally includes an enabling switch having a stationary contact 8, a movable contact 10 and a contact insulator 9 which are fixedly secured by bolts or the like 12 to the actuating member. As can be seen from FIGS. 4 and 5 axial displacement of the actuating member 3 from a retracted or normal position to an advance or start position results when the actuator post has a predetermined orientation, in the outwardly projecting arm of the movable contact 10 engaging with the contact closure post 13 which is fixedly secured both axially and angularly within a timing shaft groove 14. The advanced position of the actuator member 3 is selected so that the movable contact arm will be bent rearwardly into closing contact with the projecting arm of the non-movable contact 8 whereby the enabling contacts will be closed.

As can be appreciated, while the enabling contacts closure post 13 has a fixed orientation relative to the tuning shaft its orientation relative to the projecting arm of the movable contact 10 varies with the setting of the tuner and the closure post 13 and projecting arm will have the same orientation at only one tuner setting. Accordingly only if the radio is set at a predetermined setting will the displacement of the actuator member from the retracted position to the advanced position result in the closing of the enabling contacts thereby placing the anti-theft device in the start position. By selectively widening or narrowing the engaging portions of the closure post and movable contact projecting arm the accuracy to which the tuner must be set can be varied as desired.

The movable 10 and non-movable 8 contacts are configured to asure that the only portions of the closure post and projecting portion of the movable contact which can contact with each other are the engaging portions of these elements and it can be seen from FIG. 6 that these engaging portions are selectively configured to permit virtually undetected contact when they are displaced angularly into engaging contact.

If a person who did not know the correct setting was intent on starting the car he would either have to repetitively advance the actuator member while varying the setting of the tuner until the correct setting was sensed or he would have to vary the degree of advancement of the actuator member and rotate the tuner from one end setting to the other end setting until the closure post struck the projecting arm of the movable contact. Either alternative is unworkable by virtue of the basic geometry of the system.

To further increase the difficulty of overcoming the anti-theft device the actuator may include a series of axially extending grooves which are selectively designed to mate with the drive spine grooves for a least the last substantial portion of the actuator member's advancement. Rotation of the actuator member will accordingly be precluded during this last substantial portion of the actuator member's advancement.

Having thus disclosed my invention, what I claim is:

1. A vehicle anti-theft device comprising a pair of starter contacts adapted to be selectively closed,
   means for starting the vehicle,
   a radio including tuning means selectively locatable at any of at least a plurality of settings,
   said tuning means including a first enabling contact which has a position which varies with the setting of said tuning means,
   a second enabling contact,
   means for actuating said starting means when said starter contacts and said enabling contacts are closed,
   means for selectively displacing said second enabling contact from a first position to a predetermined position where said first enabling contact will be engaged when said tuning means is tuned to a selected one of said plurality of setting.

2. A vehicle anti-theft device according to claim 1, further comprising means for preventing the displacement of said tuning means when said second enabling contact is displaced to said second predetermined position.

3. A vehicle anti-theft device according to claim 1, wherein said tuning means further includes a tuning knob, a turning condensor, a tuning shaft interconnecting said tuning condensor and said tuning knob, and a closure pin secured to and extending outwardly from said tuning shaft, said closure pin including said first enabling contact.

4. A vehicle anti-theft device according to claim 3 further comprising means for preventing the displacement of said tuning means to vary the setting thereof when said selectively displacing means is located at said second position.

5. A vehicle anti-theft device according to claim 3, further comprising second knob means including said second enabling contact, said second knob means including a central bore selectively configured to permit displacement of said second knob from said first position where said tuning knob and several knob means will be adjacent to said second position where said second knob means will overlap said tuning knob.

6. A vehicle anti-theft device according to claim 5 wherein the inner periphery of said second knob means and the outer periphery of said tuning knob include complementary grooves whereby rotation of said tuning knob will be prevented when said second knob means is at said second position.

* * * * *